(12) United States Patent
Sumiyama et al.

(10) Patent No.: US 6,415,116 B2
(45) Date of Patent: Jul. 2, 2002

(54) IMAGE FORMING APPARATUS, JOB CONTROLLING APPARATUS, AND JOB CONTROLLING METHOD

(75) Inventors: Hiroshi Sumiyama, Aichi-Ken; Hironobu Nakata; Munetaka Fujita, both of Toyokawa; Tatsuji Hirakawa, Aichi-Ken; Takeshi Morikawa, Okazaki, all of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/820,880

(22) Filed: Mar. 30, 2001

(30) Foreign Application Priority Data

Mar. 31, 2000 (JP) .......................................... 2000-096810

(51) Int. Cl.⁷ ............................................. G03G 15/00
(52) U.S. Cl. .................................................. 399/82
(58) Field of Search ........................... 399/1, 2, 81, 82, 399/83, 85, 87

(56) References Cited

U.S. PATENT DOCUMENTS

| 5,287,194 A | * | 2/1994 | Lobiondo | ................. 399/1 X |
| 5,500,717 A | * | 3/1996 | Altrieth, III | ................. 399/83 |
| 5,587,799 A | * | 12/1996 | Kawamura et al. | ....... 399/83 X |
| 5,614,993 A | * | 3/1997 | Smith et al. | ................. 399/81 |
| 5,995,779 A | * | 11/1999 | Natsume et al. | .............. 399/82 |

FOREIGN PATENT DOCUMENTS

| JP | 10-14333 | 5/1998 |
| JP | 11-039119 | 2/1999 |

* cited by examiner

*Primary Examiner*—Sandra Brase
(74) *Attorney, Agent, or Firm*—Burns, Doane, Swecker & Mathis, LLP

(57) ABSTRACT

An image forming apparatus includes a memory for storing a first job and a second job, an output unit for sequentially outputting the first and second jobs stored in the memory, a setter for setting a recall function effective to the first job and a job controller. The recall function is a function enabling a re-output of the first job in accordance with a request of an operator after a completion of the first job. The job controller controls the output unit so as to output the second job a predetermined time later after a completion of the first job where the recall function is set effective to the first job, or output the second job immediately after a completion of the first job where the recall function is set ineffective to the first job.

13 Claims, 10 Drawing Sheets

FIG. 10

IMAGE FORMING APPARATUS, JOB CONTROLLING APPARATUS, AND JOB CONTROLLING METHOD

This application claims priority to Japanese Patent Application No. 2000-96810 filed on Mar. 31, 2000, the disclosure of which is incorporated by reference in its entirety.

BACKGROUND OF THE INVENTION

1. Field of the Invention

This invention relates to an image forming apparatus such as a digital copying machine, a job controlling apparatus and the job controlling methods.

2. Description of Related Art

As a copying machine, for example, a copying machine equipped with a memory recall mode is known. The aforementioned memory recall mode is a mode for re-outputting image data after a completion of an output of the image data. To activate the memory recall mode, it is required for an operator to manipulate an operation panel or the like so as to set the memory recall mode effective before a reading of an original by an image reader and also request a re-output of the job in accordance with the memory recall (hereinafter referred to as "memory recall job") after a completion of the output of the job.

Furthermore, a copying machine which allows an input of a job during an output operation of another job is also known.

However, in the aforementioned copying machine, in cases where a plurality of jobs are registered, the copying machine cannot output an image according to the memory recall job until a completion of the aforementioned plurality of registered jobs. Thus, a user has to wait the output of the image according to the memory recall job until the completion of the aforementioned plurality of registered jobs.

In a copying machine with a printing function which outputs the data inputted into the copying machine from an external apparatus such as a personal computer, if printing jobs from a personal computer (hereinafter referred to as "PC jobs") are input continuously, the copying machine cannot execute the re-output of the image according to the memory recall job until the completion of the PC jobs.

SUMMARY OF THE INVENTION

It is an object of the present invention to provide an image forming apparatus with enhanced operability which can secure a time for operating a re-output of an image of a job to which a recall function is set effective after an output of the image of the job and also can output an image of a job followed by a previous job immediately after an output of an image of the previous job where a recall function is not set effective to the previous job, to thereby avoid the necessity of waiting the output of the image of the job followed by the previous job.

It is another object of the present invention to provide a job controller by which a time for operating a re-output of an image of a job can be secured after an output of the image of the job to which a recall function is set effective, and an image of a job followed by a previous job can be output immediately after an output of an image of the previous job to which a recall function is not set effective.

It is still another object of the present invention to provide a job controlling method by which a time for operating a re-output of an image of a job can be secured after an output of the image of the job to which a recall function is set effective, and an image of a job followed by a previous job can be output immediately after an output of an image of the previous job to which a recall function is not set effective.

According to a first aspect of the present invention, an image forming apparatus includes a memory for storing a first job and a second job, an output unit for sequentially outputting the image of the first and second jobs stored in the memory, a setter for setting a recall function effective to the first job, the recall function being a function enabling a re-output of the first job in accordance with a request of an operator after a completion of the first job, and a job controller controlling the output unit so as to output the second job a predetermined time later after a completion of the first job where the recall function is set effective to the first job, or output the second job immediately after a completion of the first job where the recall function is set ineffective to the first job.

With this image forming apparatus, where the recall function is set effective to the first job by the setter, the job controller controls the output unit so as to output the second job a predetermined time later after the completion of the first job, and where the recall function is not set effective to the first job, the job controller controls the output unit so as to output the second job immediately after the completion of the first job.

As a result, the time for operating a re-output of a job to which the recall function is set effective can be secured. On the other hand, a job followed by a previous job to which the recall function is not set effective is output immediately, which enhances the operability.

According to a second aspect of the present invention, a job controlling apparatus for outputting a job to an outputting apparatus includes a memory for storing a first job and a second job, a setter for setting a recall function effective to the first job, wherein the recall function is a function enabling a re-output of the first job in accordance with a request of an operator after a completion of the first job, and a job controller outputting the second job a predetermined time later after a completion of the first job where the recall function is set effective to the first job, or outputting the second job immediately after a completion of the first job where the recall function is not set effective to the first job.

With this job controlling apparatus, where the recall function is set effective to the first job, the second job is output a predetermined time later after the completion of the first job, and where the recall function is not set effective to the first job, the second job is output immediately after the completion of the first job.

According to a third aspect of the present invention, a job controlling method for controlling a reading of a first job and a second job and an outputting thereof includes the steps of setting a recall function effective or ineffective to the first job, wherein the recall function is a function enabling a re-output of the first job in accordance with a request of an operator after a completion of the first job, and outputting the second job a predetermined time later after a completion of the first job where the recall function is set effective to the first job, or outputting the second job immediately after a completion of the first job where the recall function is not set effective to the first job.

With this job controlling method, where the recall function is set effective to the first job, the second job is output a predetermined time later after the completion of the first job, and where the recall function is not set effective to the first job, the second job is output immediately after the completion of the first job.

According to a fourth aspect of the present invention, an image forming apparatus includes image outputting means for outputting an image formed based on image data, storing means for storing a plurality of jobs, memory recall selection means for selectively setting a memory recall effective or ineffective to each job, wherein the memory recall makes it possible to re-output image data of each job after an output thereof, operation means for re-outputting image data of a job to which the memory recall is selectively set effective, and output timing control means for outputting a following waiting job stored in the storing means a predetermined time later after a completion of an output of a job to which the memory recall is selectively set effective in order to secure a chance of a re-output operation of the job to which the memory recall is selectively set effective by the operation means, or outputting a following waiting job stored in the storing means immediately after a completion of an output of a job to which the memory recall is selectively set ineffective.

In this application, the aforementioned "memory recall" function is defined as a function that outputs data read by a job and stores the read data in a memory even after the output of the data and re-outputs the data stored in the memory in accordance with the re-output instruction by a user.

In the aforementioned image forming apparatus, since the following waiting job stored in the memory means is output a predetermined time later after the completion of an output of a job to which the memory recall is set effective so as to secure a chance of the re-output operation of the job by the operation means. This makes it possible to execute the memory recall function by conducting the re-output operation based on the memory recall within a predetermined time by a user. On the other hand, when the output of the job to which the memory recall is set ineffective is completed, the following waiting job is output immediately. Therefore, a user waiting for the following waiting job can save a time.

Other objects and the features will be apparent from the following detailed description of the invention with reference to the attached drawings.

BRIEF DESCRIPTION OF THE DRAWINGS

The present invention will be more fully described and better understood from the following description, taken with the appended drawings, in which:

FIG. 10 shows the changes of the operation panel screen in a state that the memory recall is set ineffective.

DETAILED DESCRIPTION OF THE PREFERRED EMBODIMENTS

Figure 1:
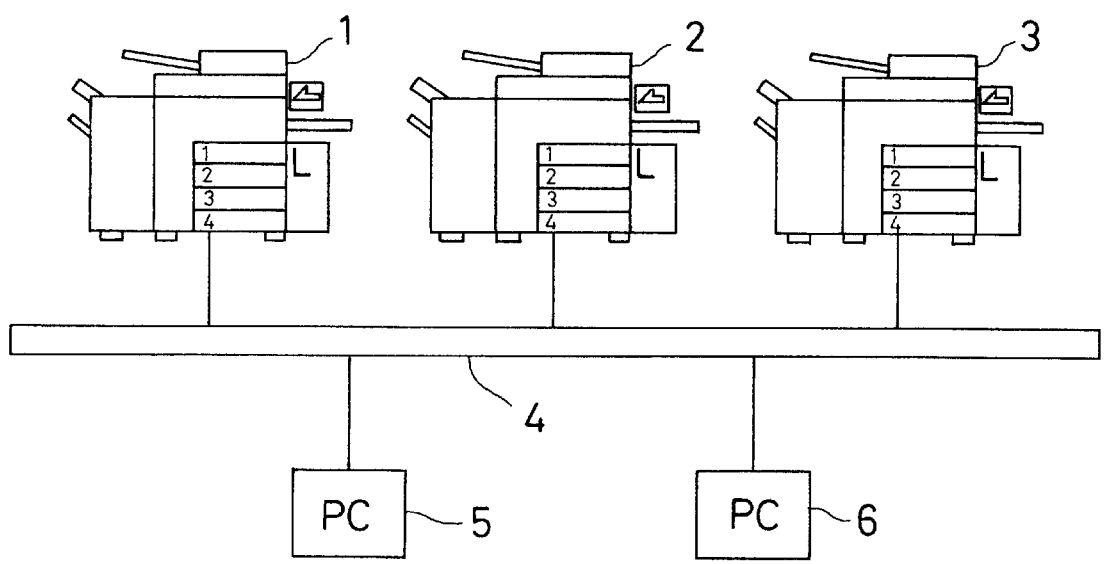
FIG. 1 shows a whole structure of a network which connects copying machines 1, 2 and 3 according to an embodiment of the present invention with personal computers.

A plurality of copying machines shown in FIG. 1 can be used as a stand-alone machine, respectively. These copying machines are connected to a network and can print an image in accordance with a printing instruction from a personal computer or the like.

FIG. 1 shows the whole structure of the network which connects the copying machines 1, 2 and 3 according to an embodiment of the present invention to the personal computers 5 and 6.

The copying machines 1, 2 and 3 are connected to the personal computers 5 and 6 via a communication circuit 4 in a bus type. From personal computers 5 and 6, image data are transmitted to the copying machines 1, 2 and 3 and images are printed by the copying machines. Furthermore, each of the copying machine 1, 2 and 3 is equipped with an image reader IR, and can print image data read by the image reader IR.

Although the following explanation will be directed to the copying machine 1, the explanation can also be applied to the copying machines 2 and 3, i.e, the structure and functions of the copying machines 2 and 3 are the same as that of the copying machine 1.

Figure 2:
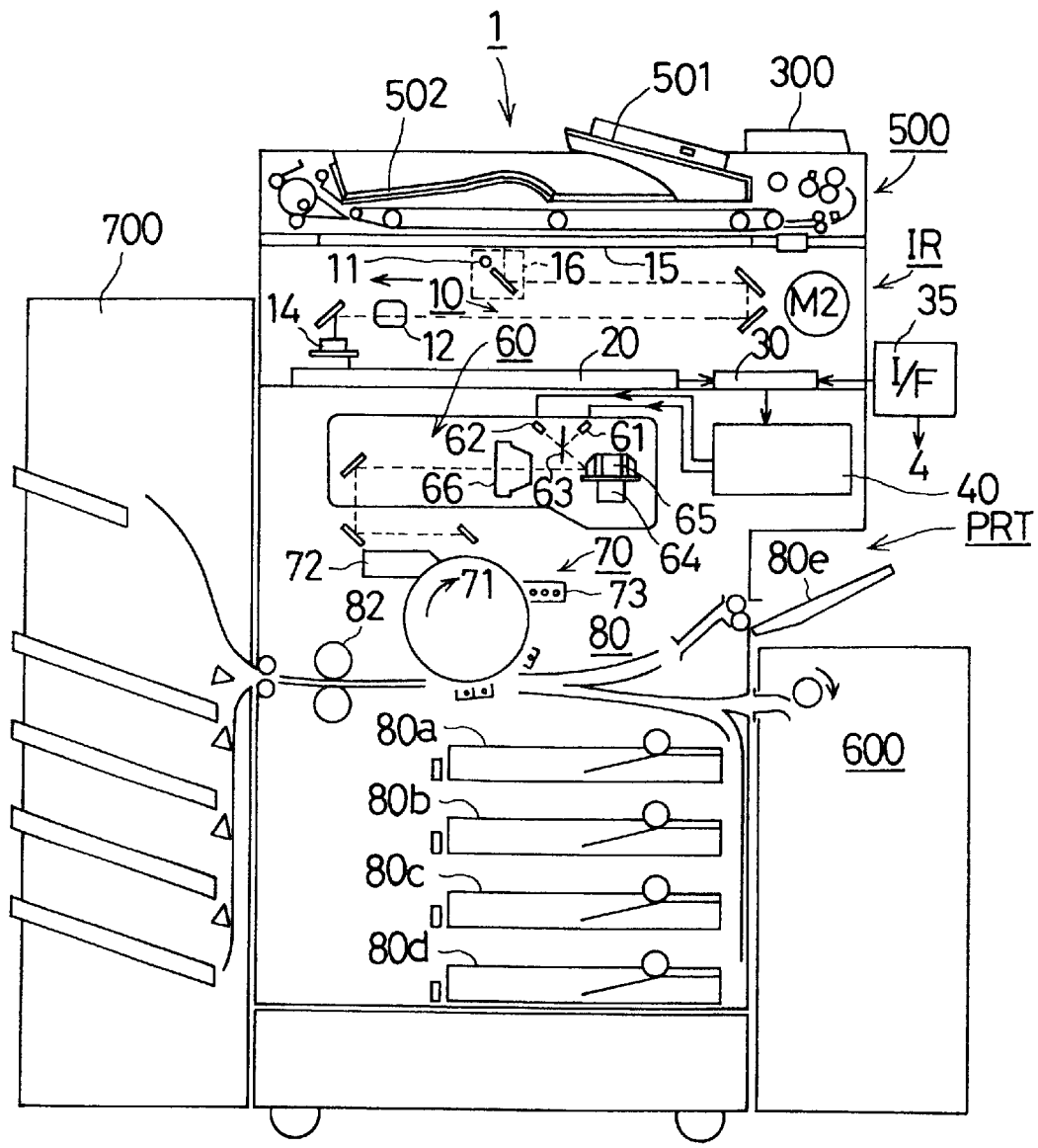
FIG. 2 is a schematic sectional view showing a schematic structure of the copying machine 1.

FIG. 2 is a sectional view showing the schematic structure of the copying machine 1.

The copying machine 1 includes an image reader IR, a memory unit portion 30, a printing apparatus PRT, an operation panel 300, an original transferring portion 500, a large capacity paper feeding apparatus 600 and a sorter 700. The image reader IR reads the image of an original to generate image data. The memory unit portion 30 temporarily stores the image data obtained by the image reader IR. The printing apparatus PRT prints an image on a paper based on the image data stored in the memory unit portion 30. The operation panel 300 is used for an input operation. The original transferring portion 500 transfers and reverses the original if necessary. The large capacity paper feeding apparatus 600 can accommodate a large number of paper and feed the paper accommodated therein one by one. The sorter 700 receives and sorts the sheets of paper on which an image is printed. These operation is controlled by the below-mentioned control portion.

In the original transferring portion 500, the original set on the original paper tray 501 will be automatically set to the reading position on the platen glass 15 from the lower-most original in respond to a print command. After the image reader IR reads the original, the original is discharged to the ejection tray 502.

The image reader IR includes a scanning system 10 and an image signal processing portion 20.

In the scanning system 10, the original placed at the reading position is exposed to the exposure lamp 11 fixed to the scanner 16 which moves below the original. The reflected light from the original is guided into the photoelectric converter 14 including a CCD array and the like via the reflecting mirrors and the collective lens 12.

Subsequently, the signals generated by this scanning system 10 is transferred to the image signal processing portion 20. In the image signal processing portion 20, the input signals are subjected to image processing, such as binarization, image correction, enlargement or reduction, and image editing. The processed image data are stored in the memory unit portion 30.

The printing apparatus PRT includes a print processing portion 40, an optical system 60, an image forming system 70 and a paper conveyance system 80.

The print processing portion 40 drives the optical system 60 based on the image data from the memory unit portion 30. In the optical system 60, semiconductor lasers 61 and 62 emit a laser beam based on the signal controlled by the print processing portion 40, respectively. These laser beams are combined into a single beam by the dichroic mirror 63, reflected by a polygon mirror 65 rotated by a motor 64, and irradiated towards the photosensitive drum 71 of the image forming system 70 via a main lens 66.

In the image forming system 70, the photosensitive drum 71 is electrically charged by an electrification charger 72 in advance. Then, the laser beam guided by the optical system 60 irradiates the charged drum 71, whereby an electrostatic latent image is formed on the photosensitive drum 71. Subsequently, the developer 73 forms a toner image on the electrostatic latent image. The toner image on the photosensitive drum 71 is transferred onto a paper which was supplied from the paper-supply tray 80a, 80b, 80c and 80d of the paper conveyance system 80, the large capacity paper feeding apparatus 600 or a manual paper-supply tray 80e. Then, the paper bearing the toner image is carried to fixing rollers 82 by which the toner image is fixed to the paper with heat and pressure. Finally, the paper is ejected to the sorter 700.

The aforementioned paper-supply trays 80a, 80b and 80c and the large capacity paper feeding apparatus 600 are fixed paper-supply trays on which regulation plate-members for regulating four sides of a paper are fixed at the position corresponding to the paper size so that each of the trays can accommodate predetermined standard-side papers, respectively.

The paper-supply tray 80d is a universal paper-supply tray provided with regulation plate-members movable depending on the paper size so that papers of various sizes can be fed.

The manual paper-supply tray 80e is provided to the copying machine so as to project outwardly therefrom and provided with adjustable regulation plate-members for regulating the side edges of a paper so that any standard-size and non-standard size paper can be placed. By using this manual paper-supply tray 80e, it becomes possible to easily feed a special paper with comparatively low frequency of use, such as OHP papers, pasteboards, color papers, other than papers set in paper-supply trays 80a, 80b, and 80c and 80d.

Moreover, the copying machine 1 has a communication interface 35. With this communication interface 35, when necessary, the copying machine 1 can exchange image data or the like with external apparatuses including the personal computers 5 and 6 and the other copying machines 2 and 3 via the communication circuit 4 of the network as shown in FIG. 1.

Figure 3:
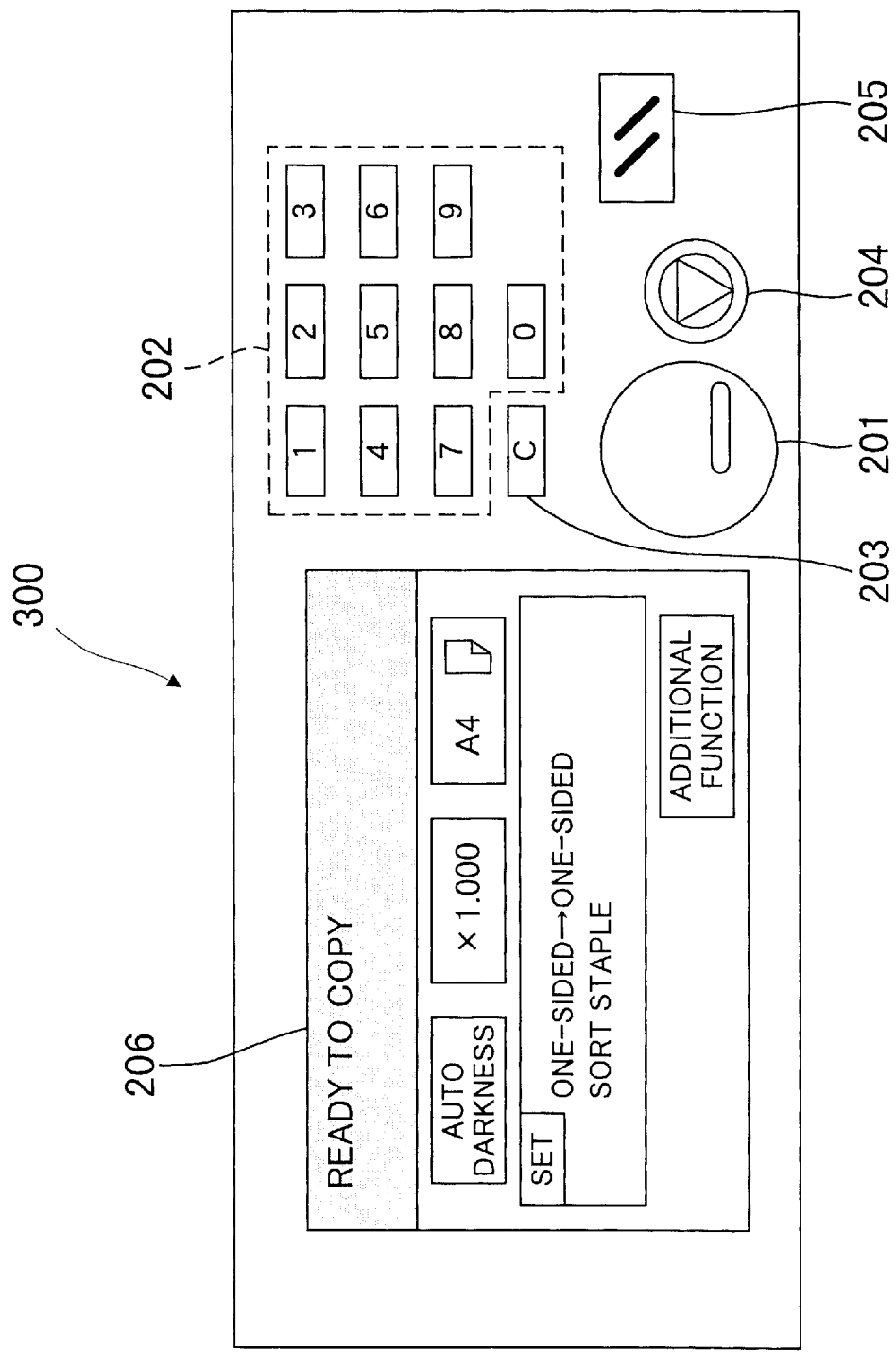
FIG. 3 is a front view of an operation panel of the copying machine shown in FIG. 2.

FIG. 3 shows the front view of the operation panel 300 of the image forming apparatus.

In FIG. 3, the reference numeral 201 denotes a start key for instructing a start of the operation. The reference numeral 202 denotes a ten key for inputting numerical values such as the number of sheets to be copied. The reference numeral 203 is a clear key for clearing the input numerical value. The reference numeral 204 denotes a stop key for stopping the operation. The reference numeral 205 denotes a panel reset key for canceling the set mode and print job. The reference numeral 206 denotes an LCD display for displaying various modes. The operation panel 300 has a touch panel on the surface thereof so that various key inputs can be performed by touching the key displayed on the LCD display 206.

Figure 4:
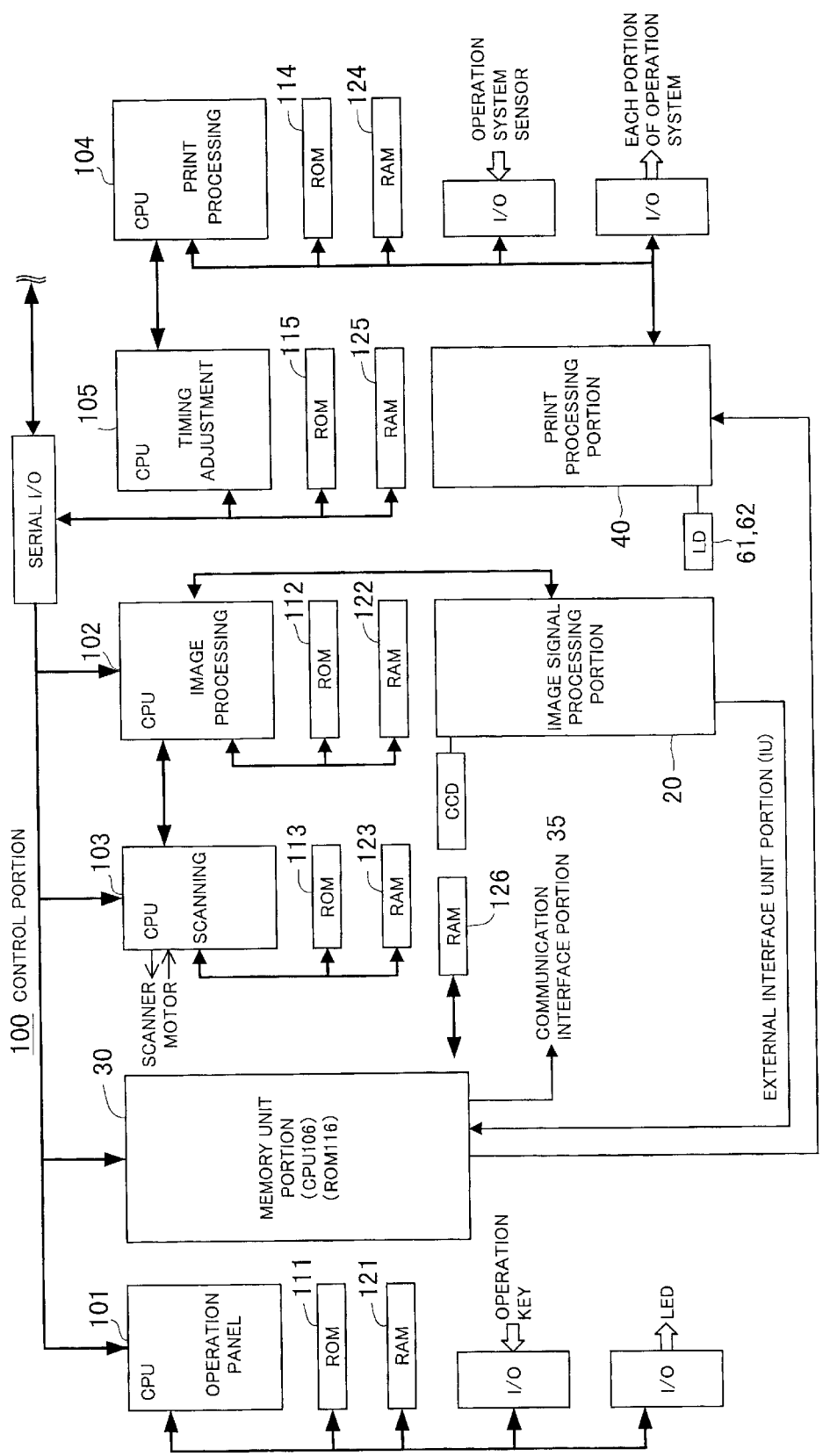
FIG. 4 shows an explanatory block diagram showing a structure of a control portion 100 of the copying machine 1 together with FIG. 5.
Figure 5:
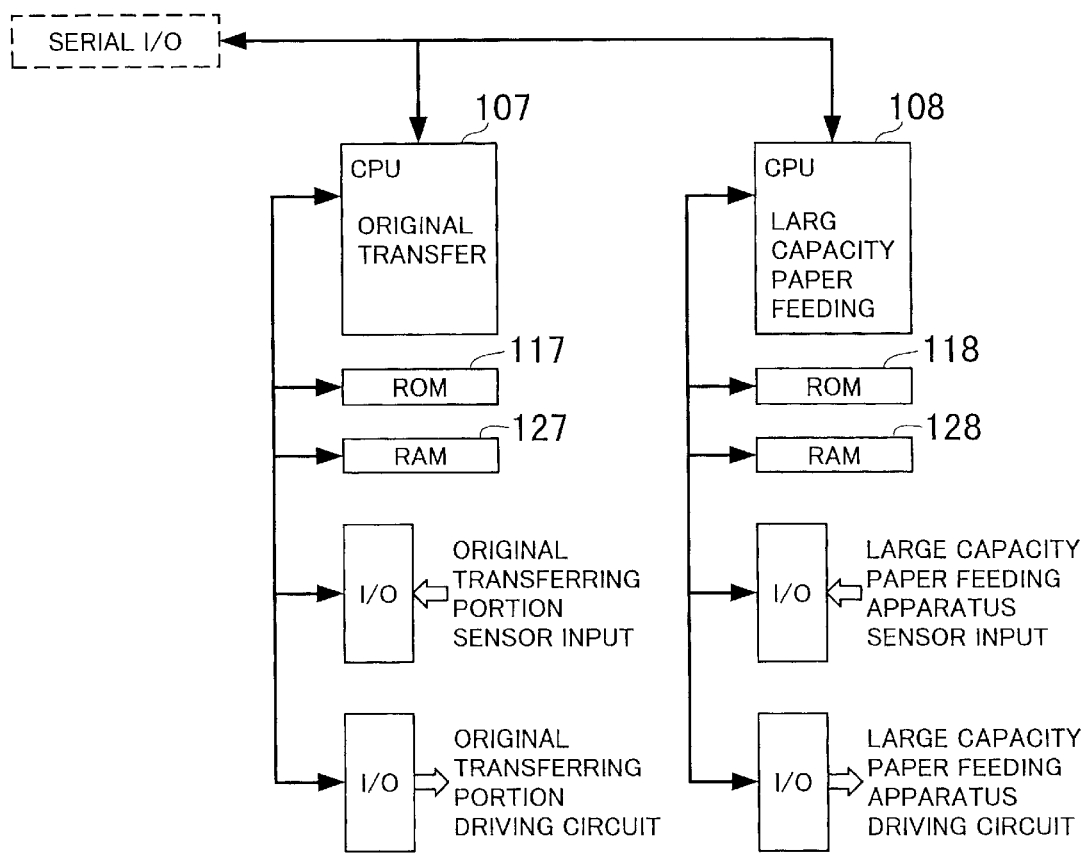
FIG. 5 shows an explanatory block diagram showing the structure of the control part 100 of the copying machine 1 together with FIG. 4.

Next, the control portion 100 will be explained. FIGS. 4 and 5 show a block diagram for explaining the structure of the control portion 100 of the copying machine 1.

The control portion 100 is constituted mainly by eight CPUs 101–108 equipped with ROMs 111–118 storing programs and RAMs 121–128 as a work area for executing programs. The CPU 106 and the ROM 116 are provided in the memory unit portion 30.

The CPU 101 controls input signals from various operation keys and the display. The CPUs 102 and 103 control each part of the image signal processing portion 20 and the driving of the scanning system 10, respectively. Moreover, the CPU 104 controls the print processing portion 40, the optical system 60 and the image forming system 70. The CPU 105 performs processing for overall timing adjustments and/or operation mode setups of the control portion 100.

The CPU 106 once stores the image data read by the image reader IR and the image data sent from the personal computers 5 and 6 in a memory by controlling the memory unit portion 30, and then reads and outputs them to the print processing portion 40. Thereby, the image reader IR and the printing apparatus PRT are controlled independently to improve the copying speed. The CPU 106 is connected to a communication interface portion 35 for exchanging the data with external apparatus in a network as shown in FIG. 1.

The CPU 107 controls the original transferring portion 500, and the CPU 108 controls the large capacity paper feeding apparatus 600. Among these CPUs 101–108, a serial communication by an interrupt is performed to exchange data.

Figure 6:
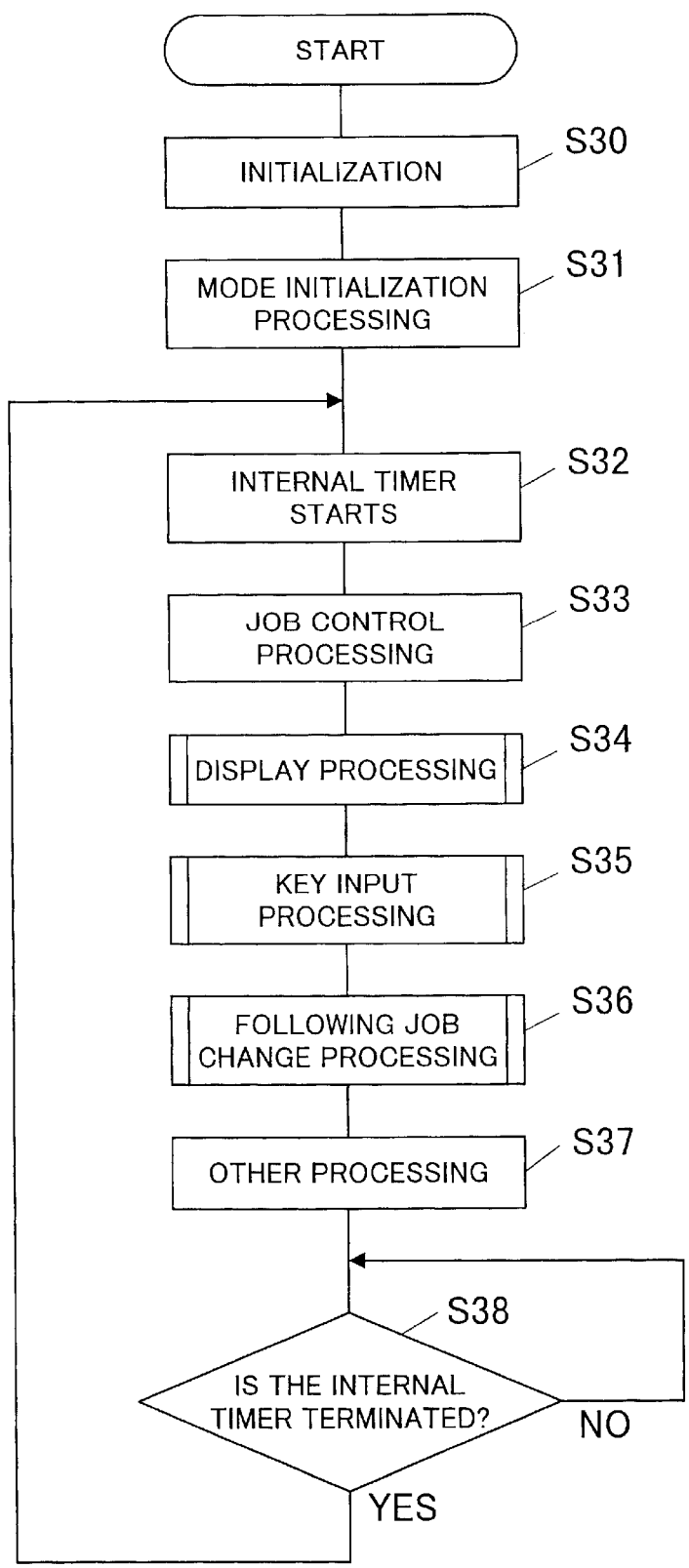
FIG. 6 shows a flow chart showing a control procedure of a user interface and a machine operation performed by a CPU 101.

FIG. 6 is a flow chart showing a control procedure of the user interface and the machine operation performed by the CPU 105. In the following explanation and drawings, a step is abbreviated as "S."

When the CPU 105 is reset and the program starts, in S30, an initialization of the CPU 101, such as a clearance of the RAM and a setup of various registers, is performed. Then, in S31, an initialization processing of the copying machine mode is performed.

Next, in S32, the internal timer, which is built in the CPU 105 and has a previously set initial value, starts.

Subsequently performed one by one are a print job control processing (S33) for determining the status of the present print job, a display processing (S34) of the LCD display 206 of the operation panel 300, a key input processing (S35) of a hard key and a touch panel, a following job change processing (S36) for controlling the following job change and other processing (S37).

After the completion of all of the processing, the routine waits for the termination of the initially set internal timer (S38) to conclude one routine, and returns to S32. Calculation of various timers which appear in a subroutine is performed by using the length of the time of this one routine.

In other words, the termination of the timer is judged by how many times the value of various timers repeated this one routine.

Figure 7:
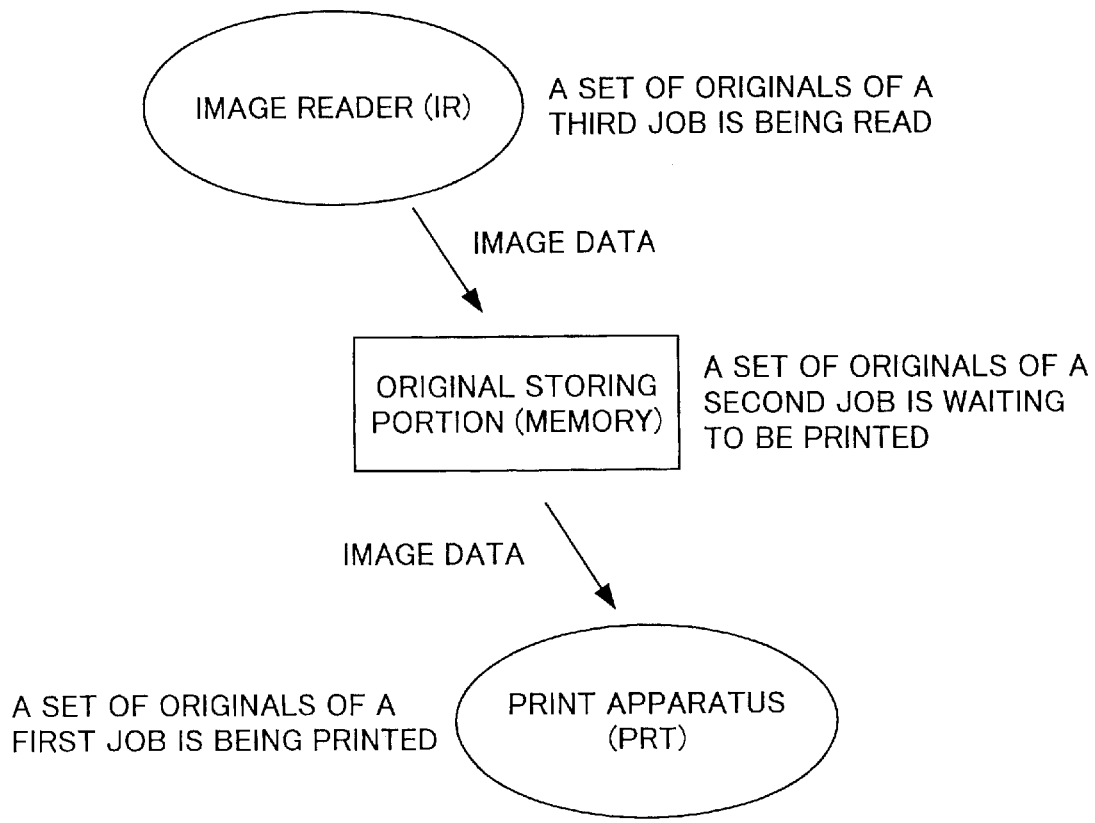
FIG. 7 is an explanatory view showing the outline of a multi-print job operation.

FIG. 7 shows schematic explanatory drawings of a multi-print job operation.

According to the multi-print job, in the digital copying machine with an image memory (RAM 126 of the memory unit portion 30), during the output operation of a set of original images by the print apparatus PRT, a set of original images is read by the image reader IR in accordance with a reservation via an operation panel 300 or new image data are received from a network to be stored in an image memory.

In other words, in the multi-print job, during the output operation of the first print job by the print apparatus PRT, a second job or a third print job of a set of image data unrelated to the first print job is read by the image reader IR or received from a network to be stored. Thus, a plurality of print jobs are carried out simultaneously.

In this embodiment, image data of each of a plurality of waiting print jobs are stored in the RAM 126 corresponding to the information on the selected paper-supply tray for supplying a paper on which the aforementioned image data is printed among the paper-supply trays 80a, 80b, 80c and 80d, the large capacity paper feeding apparatus 600 and the manual paper-supply tray 80e.

Figure 8:
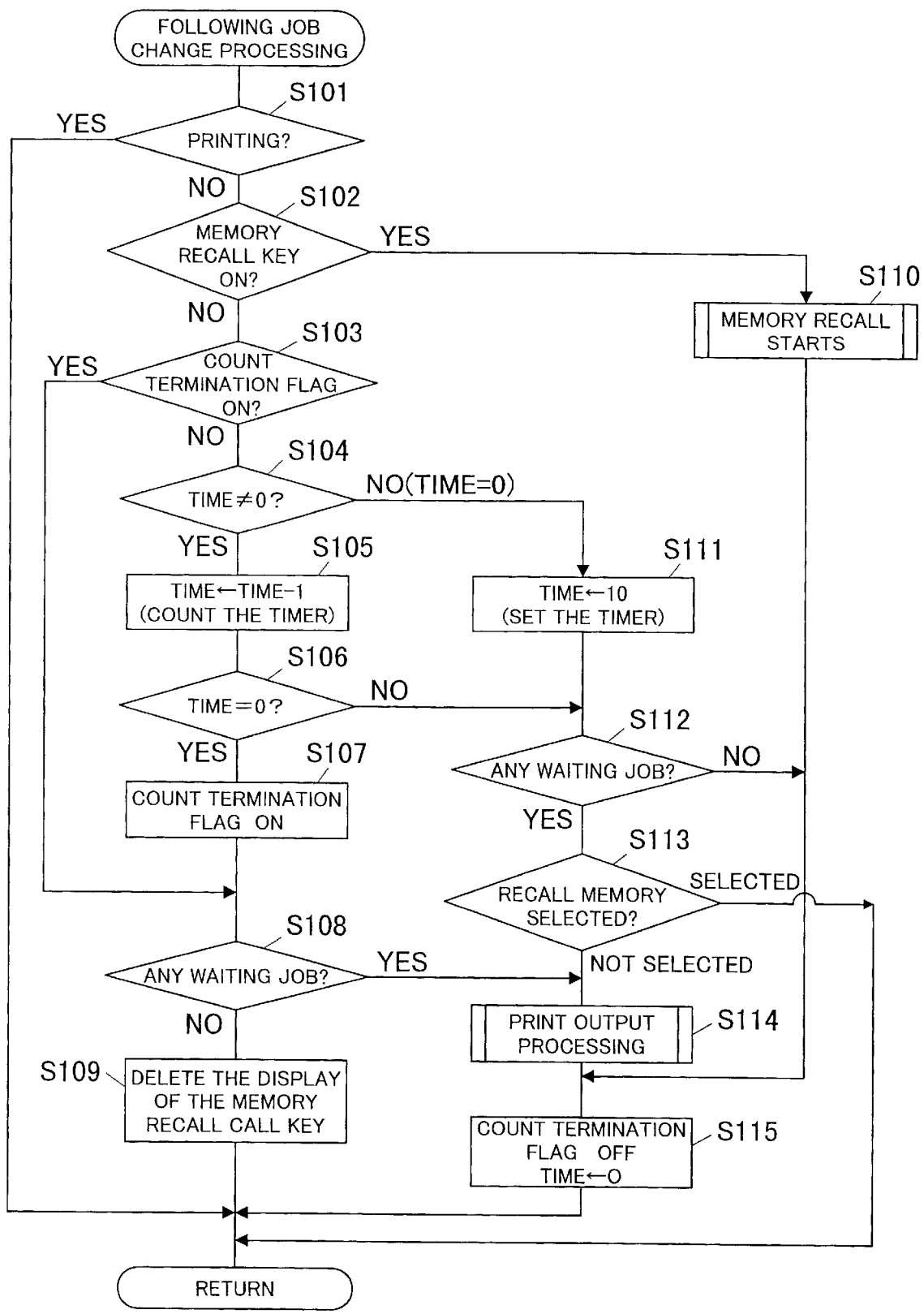
FIG. 8 shows a flow chart showing the contents of the following job change processing in S36 shown in FIG. 6.

FIG. 8 is a flow chart showing the contents of the job change processing of S36 in FIG. 6.

First, in S101, it is judged whether or not the print operation of a certain job is completed. If completed (NO in S101), the routine proceeds to S102. If not completed (YES in S101), the routine returns. In S102, it is judged whether or not the memory recall call key is turned on. If turned on (YES in S102), the routine proceeds to S110 in which a memory recall is started. When the memory recall call key is not turned on (NO in S102), in order to count a predetermined time, the routine proceeds to S103, S104, S105, and S111. In S103, it is judged whether a flag showing whether a counter timer TIME for counting a predetermined time is already completed is ON or OFF. If the timer is terminated, i.e., the flag is ON (YES in S103), the routine proceeds to S108.

When the counter termination flag is not ON (NO in S103), the routine proceeds to S104 and it is judged whether or not the timer TIME is 0. If the timer TIME is not 0 (YES in S104), the routine proceeds to S105 to perform the decrement of the timer TIME. Then, the routine proceeds to S106.

If the timer TIME is 0 (NO in S104), the routine proceeds to S111 to set the time (10 seconds in this embodiment) of the timer TIME 2. Thereafter, the routine proceeds to S112.

In S106, it is judged whether or not the result of carrying out the decrement of the timer TIME is 0. If it is 0 (YES in S106), the routine proceeds to S107, and a count termination flag is turned on. If it is not 0 (NO in S106), the routine will proceed to S112.

In S112, it is judged whether or not there is any waiting job. If there is a waiting job (YES in S112), the routine will proceed to S113. If there is no waiting job (NO in S112), the routine will proceed to S115.

In S113, it is judged whether or not the memory recall which can be set to each job is set to effective. If the memory recall is selected (Selected in S113), the routine returns, and the timer TIME starts to count. If the memory recall is not selected (NOT selected in S113), the routine proceeds to S114, and the output processing of the waiting job is performed. After the print output processing, the routine proceeds to S115 to turn off the count termination flag to set the timer TIME to 0. Then, the routine returns.

On the other hand, in S108, it is judged whether or not there is any waiting job. If there is any waiting job (YES in S108), the routine proceeds to S114 and then to S115. If there is no waiting job (NO in S108), the routine will proceed to S109 to delete the display of the memory recall call key.

As mentioned above, when the memory recall is effective, the chance for performing the memory recall can be secured by not outputting the waiting job for a predetermined time after the termination of the printing process of the job. On the other hand, when the memory recall is ineffective, the waiting job is output immediately.

Figure 9:
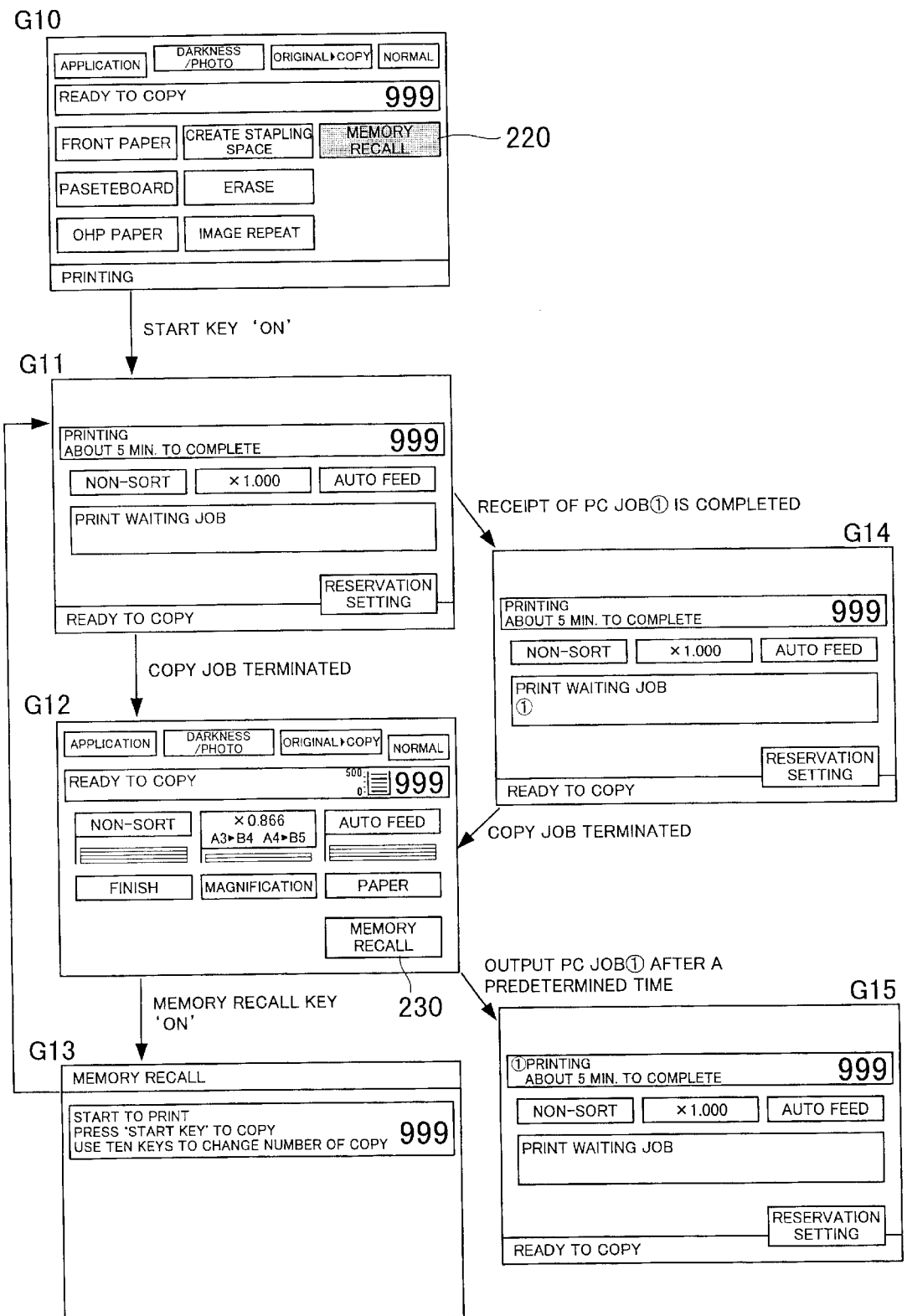
FIG. 9 shows the changes of the operation panel screen in a state that the memory recall is set effective.
Figure 10:
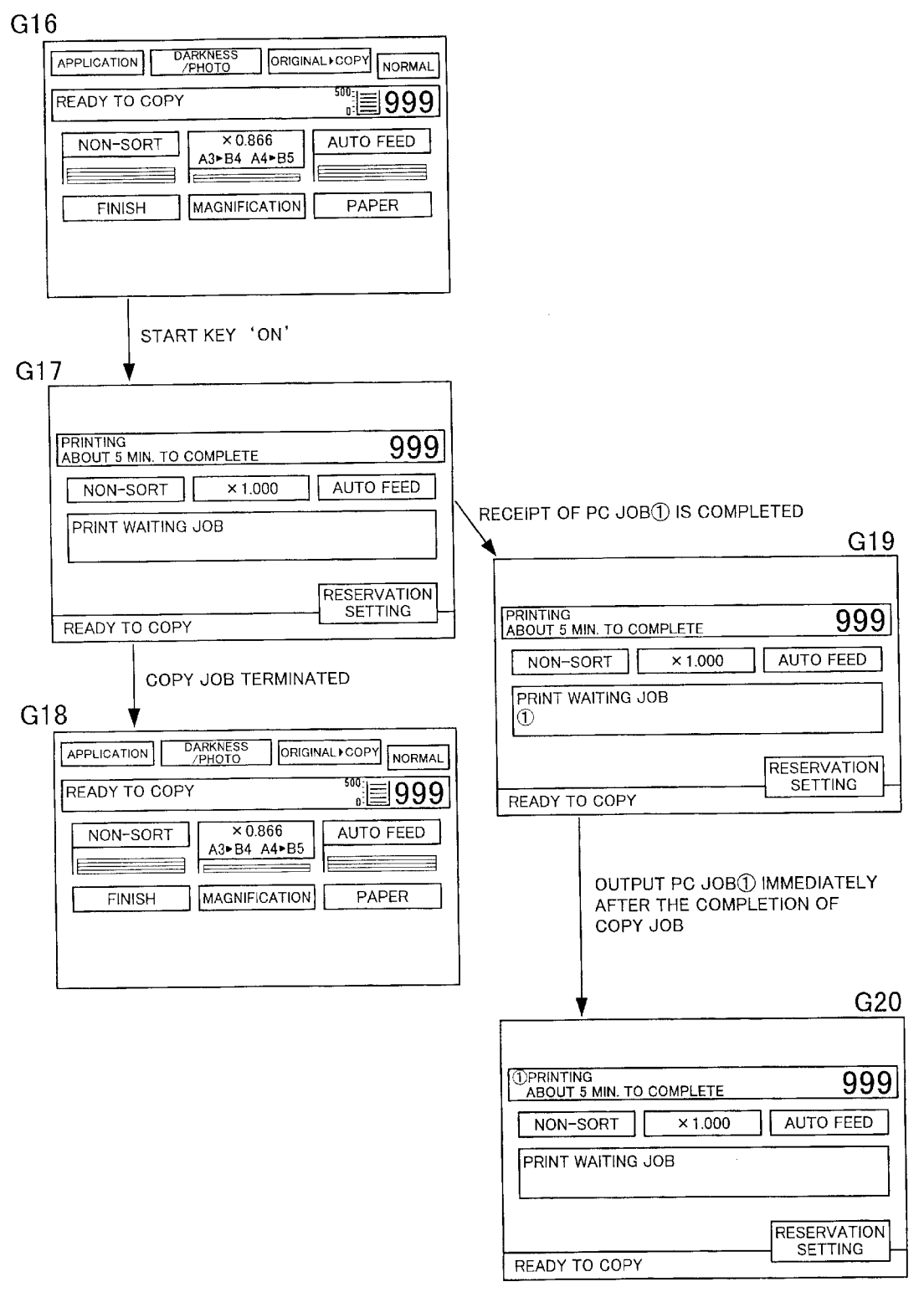

FIGS. 9 and 10 show the screen changes of the LCD display 206 of the operation panel (see FIG. 3). Although these figures show the flow in cases where the job (PC job) is received from personal computers 5 and 6 during the copy job print, it is also applied to the case where a copy job is reserved during a copy job print and/or the receiving of the PC job is completed during the PC job print. However, setting the memory recall of the PC job effective or ineffective can be performed from the personal computers 5 and 6.

In FIG. 9, G10 shows the setting screen for setting a memory recall effective or ineffective to each job. G10 shows the state that the memory recall is set effective by pressing the memory recall setting key 220. When the start key 201 (see FIG. 3) is pressed, the screen changes to G11.

G11 shows a screen when a print job is being processed. In the screen, if there is no waiting job, "Print waiting job" is not displayed. During the print processing, when it is completed to receive the PC job, the screen changes to G14, and "Print waiting job ①" is displayed. After the completion of the copy job, the screen changes to G12.

After the completion of the copy job, since the memory recall is set effective, the memory recall call key 230 is displayed in G12.

By pressing the memory recall call key 230, a screen for starting the recall job is displayed as shown in G13. In this case, it is possible to change the output number of copies. When the memory recall call key 230 is not pressed, the PC job ① which is a waiting job is output after the predetermined time later. G15 shows the screen during the print process of the job ①.

In FIG. 10, G16 shows the basic screen in cases where the memory recall is not set effective. When the start key 201 is turned on, the screen will change to G17 which is the same screen as G11. In G17, in cases where there is no waiting job, "Print waiting job" is not displayed. After the completion of the copy job, the screen changes to G18. In G18, since the memory recall is not set effective, the memory recall call key 230 is not displayed.

G19 shows the same screen as G14 during a print process in the state that it is completed to receive the PC job. Since the memory recall is not set effective, the screen changes to G20 immediately after the termination of the copy job.

G20 shows the same screen as G15 during the printing process of the job ①.

The terms and expressions which have been employed herein are used as terms of description and not of limitation, and there is no intent, in the use of such terms and expressions, of excluding any of the equivalents of the features shown and described or portions thereof, but it is recognized that various modifications are possible within the scope of the invention claimed.

What is claimed is:

1. An image forming apparatus, comprising:

a memory for storing a first job and a second job;

an output unit for sequentially outputting said first and second jobs stored in said memory;

a setter for setting a recall function effective to said first job, said recall function being a function enabling a re-output of said first job in accordance with a request of an operator after a completion of said first job; and a job controller for controlling said output unit so as to output said second job a predetermined time later after a completion of said first job where said recall function is set effective to said first job, or output said second job immediately after a completion of said first job where said recall function is set ineffective to said first job.

2. The image forming apparatus as recited in claim 1, further comprising a display for showing that said recall function is set effective where said recall function is set effective to said first job.

3. The image forming apparatus as recited in claim 1, wherein said output unit is a printer for outputting an image on a sheet.

4. The image forming apparatus as recited in claim 1, further comprising an image reader for reading an image of an original, wherein said first job is a job for outputting an image based on image data read by said image reader.

5. The image forming apparatus as recited in claim 4, wherein said second job is a job for outputting an image based on image data sent from an external data processing apparatus.

6. A job controlling apparatus for outputting a job to an outputting apparatus, said job controlling apparatus, comprising:

a memory for storing a first job and a second job;

a setter for setting a recall function effective to said first job, wherein said recall function is a function enabling a re-output of said first job in accordance with a request of an operator after a completion of said first job; and a job controller for outputting said second job a predetermined time later after a completion of said first job where said recall function is set effective to said first job, or outputting said second job immediately after a completion of said first job where said recall function is set ineffective to said first job.

7. The job controlling apparatus as recited in claim 6, further comprising a display for showing that said recall function is set effective where said recall function is set effective to said first job.

8. The job controlling apparatus as recited in claim 6, wherein said first job is a job for outputting an image based on image data read by an image reader.

9. The job controlling apparatus as recited in claim 8, wherein said second job is a job for outputting an image based on image data sent from an external data processing apparatus.

10. A job controlling method for controlling a reading of a first job and a second job and an outputting thereof, said job controlling method, comprising the steps of:

setting a recall function effective or ineffective to said first job, wherein said recall function is a function enabling a re-output of said first job in accordance with a request of an operator after a completion of said first job; and outputting said second job a predetermined time later after a completion of said first job where said recall function is set effective to said first job, or outputting said second job immediately after a completion of said first job where said recall function is set ineffective to said first job.

11. The job controlling method as recited in claim 10, wherein said first job is a job for outputting an image based on image data read by an image reader.

12. The job controlling method as recited in claim 11, wherein said second job is a job for outputting an image based on image data sent from an external data processing apparatus.

13. An image forming apparatus, comprising:

image outputting means for outputting an image formed based on image data;

storing means for storing a plurality of jobs;

memory recall selection means for selectively setting a memory recall effective or ineffective to each job, wherein said memory recall makes it possible to re-output image data of said each job after an output thereof;

operation means for re-outputting image data of a job to which said memory recall is selectively set effective; and output timing control means for outputting a following waiting job stored in said storing means a predetermined time later after a completion of an output of a job to which said memory recall is selectively set effective in order to secure a chance of a re-output operation of said job to which said memory recall is selectively set effective by said operation means, or outputting a following waiting job stored in said storing means immediately after a completion of an output of a job to which said memory recall is selectively set ineffective.

* * * * *